T. E. BEHAN.
TRACTOR ANTISLIPPING DEVICE.
APPLICATION FILED AUG. 5, 1915.
1,201,795.
Patented Oct. 17, 1916.
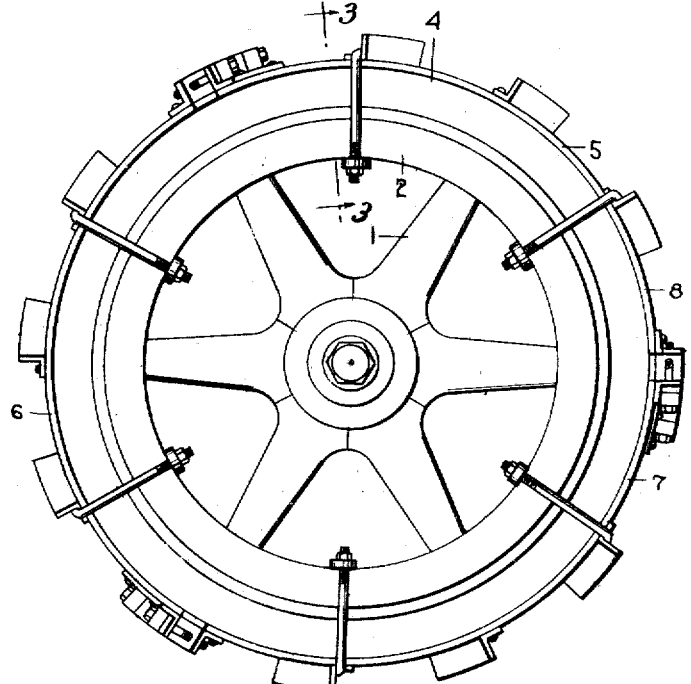
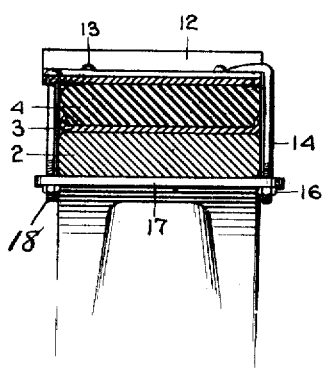
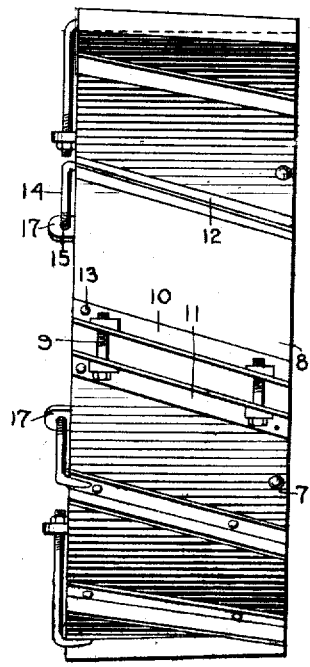
WITNESSES
INVENTOR
Thomas E. Behan
BY
ATTORNEYS

UNITED STATES PATENT OFFICE.

THOMAS EDWARD BEHAN, OF NEW YORK, N. Y.

TRACTOR-ANTISLIPPING DEVICE.

1,201,795.  Specification of Letters Patent.  Patented Oct. 17, 1916.

Application filed August 5, 1915. Serial No. 43,793.

*To all whom it may concern:*

Be it known that I, THOMAS E. BEHAN, a citizen of the United States, and a resident of the city of New York, borough of Manhattan, in the county and State of New York, have invented a new and Improved Tractor-Antislipping Device, of which the following is a full, clear, and exact description.

This invention relates to anti-slipping or anti-skidding devices for wheels and has for an object the provision of an improved arrangement which may be clamped in place on any form of wheel.

Another object in view is to provide an anti-slipping device arranged in sections so as to be clamped in position on any suitable wheel and adjusted so as to fit tightly against the wheel.

A still further object in view is to provide an anti-slipping device for tractor wheels which are provided with bolts and clamping bars for engaging the under part of the wheel felly so that the anti-slipping structure is secured in place at a large number of points over the wheel.

In the accompanying drawings:—Figure 1 is a side view of a wheel with an embodiment of the invention applied thereto; Fig. 2 is an edge view of the structure shown in Fig. 1; Fig. 3 is a section through Fig. 1 on line 3—3.

Referring to the accompanying drawings by numerals, 1 indicates the body of a wheel which is provided with a felly 2 of any desired or usual construction. On the felly 2 is arranged a metallic rim 3 for receiving the rubber tire 4. The construction of the tire 4, rim 3 and associated parts is the usual construction commonly found on the market at the present time. The rubber tire 4 is, under ordinary circumstances, satisfactory, but where the streets become slippery for any reason, as for instance when there is snow on the street, other means are necessary to prevent the slipping of the wheel, especially when the wheel is a power wheel for driving an automobile or some other form of power driven vehicle.

In order to provide means for preventing the slipping of the wheel an anti-slipping ring 5 is provided which is formed in a plurality of sections 6, 7 and 8, bolted together, as shown more clearly in Fig. 2, by a plurality of bolts 9 which pass through upstanding flanges of angle irons 10 and 11. It will be noticed that there is an appreciable space between the angle iron 10 and the angle iron 11. This allows for an adjustment of the various sections 6, 7 and 8 and also allows the same to be properly clamped on a wheel having a new tire or on a wheel having an old tire which is, of course, of somewhat less diameter than a new tire. The upstanding flanges of the angle irons 10 and 11 dig into the snow or other matter on the street and assist in preventing the slipping of the wheel. In connection with these members a plurality of angle irons 12 are utilized, the same having upstanding flanges. All of the angle irons 10, 11 and 12 are preferably arranged at an angle to a line parallel to the axis of the wheel, as shown in Fig. 2. The various angle irons may be secured in position by rivets 13 or other suitable securing means.

Secured to one end of the angle irons 12 are anchoring bolts 14, which anchoring bolts are provided with threads 15 for receiving nuts 16. The anchoring bolts 14 extend through one end of the clamping bar 17, while the opposite end of the clamping bar accommodates the threaded end of bolt 18, which bolt is secured by welding or any suitable manner to the tire or ring 5. It is of course evident that the anchoring bolts 14 and 18 could be secured to the opposite ends of the angle irons 12, but the arrangement as shown in Fig. 2 is preferable as it allows the clamping bars 17 to extend transversely of th wheel and thus provides a firm anchoring device. Any desired number of bolts 14 and 18 may be used for each of the sections 6, 7 and 8, and it is of course evident that any number of sections could be used, three being shown merely for the purpose of illustration.

By arranging the anti-slipping device in sections it is evident that any injured section may be removed and a new one substituted at any time, and also any of the angle irons 12 may be removed and new ones secured at any time, said angle irons being held in place by suitable rivets or other suitable means.

What I claim is:—

1. In a device of the character described, a plurality of sections, and means for holding said sections in place upon a wheel, said means including radially extending anchor bolts secured at their outer ends to said sections, anchor bolts extending through said sections opposite the first mentioned anchor bolts, a clamping bar fitting over each pair of anchor bolts, and means for clamping said clamping bars to said bolts, said clamping bars engaging said wheel.

2. The combination with a wheel having a felly and tire, of an anti-slipping device comprising a ring structure fitting the periphery of the tire and projecting at one side edge, transversely extending clamping bars engaging the inner surface of the wheel felly and projecting at their ends, anchoring bolts secured at one end to the projecting edge of the ring structure and having screw threaded inner ends extending through the said clamping bars at one end thereof, oppositely arranged anchoring bolts having inwardly bent outer ends, secured to the ring structure, the inner ends of said bolts being screw threaded and extending through the other ends of the clamping bars, and nuts on the ends of the said bolts for clamping the said clamping bars in position.

In testimony whereof I have signed my name to this specification in the presence of two subscribing witnesses.

THOMAS EDWARD BEHAN.

Witnesses:
ARTHUR C. BEHAN,
LILLIE EVELYN BEHAN.

Copies of this patent may be obtained for five cents each, by addressing the "Commissioner of Patents, Washington, D. C."